(12) United States Patent
Heo et al.

(10) Patent No.: US 11,822,741 B2
(45) Date of Patent: Nov. 21, 2023

(54) ELECTRONIC DEVICE, OPERATION METHOD THEREOF, AND NON-TRANSITORY STORAGE MEDIUM

(71) Applicant: SAMSUNG ELECTRONICS CO., LTD., Suwon-si (KR)

(72) Inventors: Hoondo Heo, Suwon-si (KR); Jongdae Park, Suwon-si (KR); Minuk Kim, Suwon-si (KR); Jungwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 17/508,667

(22) Filed: Oct. 22, 2021

(65) Prior Publication Data
US 2022/0043530 A1 Feb. 10, 2022

Related U.S. Application Data

(63) Continuation of application No. PCT/KR2020/005376, filed on Apr. 23, 2020.

(30) Foreign Application Priority Data

Apr. 23, 2019 (KR) ........................ 10-2019-0047563

(51) Int. Cl.
  *G06F 3/041* (2006.01)
  *G06F 3/04886* (2022.01)
  *G06F 9/451* (2018.01)

(52) U.S. Cl.
  CPC ........ *G06F 3/0416* (2013.01); *G06F 3/04886* (2013.01); *G06F 9/451* (2018.02);
  (Continued)

(58) Field of Classification Search
  CPC .. G06F 3/0416; G06F 3/04102; G06F 3/0418; G06F 3/04886; G06F 3/0488;
  (Continued)

(56) References Cited

U.S. PATENT DOCUMENTS

| 8,654,095 B1* | 2/2014 | Cho ..................... G06F 1/1652 345/173 |
| 8,692,802 B1* | 4/2014 | Maharyta ............ G06F 3/04182 345/173 |

(Continued)

FOREIGN PATENT DOCUMENTS

| JP | 2013-528303 | 7/2013 |
| KR | 10-2009-0079405 | 7/2009 |

(Continued)

OTHER PUBLICATIONS

International Search Report for PCT/KR2020/005376 dated Jul. 22, 2020, 13 pages.

(Continued)

*Primary Examiner* — Ryan A Lubit
(74) *Attorney, Agent, or Firm* — Nixon & Vanderhye P.C.

(57) ABSTRACT

Various embodiments of the disclosure relate to an electronic device and an operation method thereof. The electronic device may comprise: a display comprising a touch screen; a memory; and at least one processor electrically connected to the display and the memory. The memory may store instructions which, when executed, cause the at least one processor to: store, in the memory, information associated with a plurality of algorithms for identifying the location of an input; identify, among the plurality of algorithms, a first algorithm corresponding to a first screen region which is a portion of a screen region of the touch screen; identify a first input on the first screen region; and using the first algorithm, acquire touch coordinate information, corre- (Continued)

sponding to the location corresponding to the first input, on the touch screen.

13 Claims, 17 Drawing Sheets

(52) U.S. Cl.
CPC .............. *G06F 2203/04101* (2013.01); *G06F 2203/04102* (2013.01); *G06F 2203/04803* (2013.01)

(58) Field of Classification Search
CPC .......... G06F 3/14; G06F 3/1431; G06F 9/451; G06F 9/50; G06F 9/5016; G06F 2203/04101; G06F 2203/04102; G06F 2203/04803

See application file for complete search history.

(56) References Cited

U.S. PATENT DOCUMENTS

| | | | |
|---|---|---|---|
| 2009/0184935 A1 | 7/2009 | Kim | |
| 2010/0044121 A1* | 2/2010 | Simon | G06F 3/04883 178/18.03 |
| 2011/0304550 A1 | 12/2011 | Romera Jolliff et al. | |
| 2012/0182259 A1 | 7/2012 | Han | |
| 2013/0234982 A1* | 9/2013 | Kang | G06F 3/04186 345/174 |
| 2015/0109243 A1* | 4/2015 | Jun | G06F 3/04886 345/174 |
| 2017/0315694 A1 | 11/2017 | Alonso Ruiz et al. | |
| 2017/0358113 A1* | 12/2017 | Bray | G06F 3/14 |
| 2018/0032195 A1 | 2/2018 | Lee et al. | |
| 2018/0046359 A1 | 2/2018 | Kim et al. | |
| 2019/0179487 A1 | 6/2019 | Kong et al. | |
| 2019/0265826 A1 | 8/2019 | Matsuishi | |

FOREIGN PATENT DOCUMENTS

| | | |
|---|---|---|
| KR | 10-2011-0119189 | 11/2011 |
| KR | 10-2012-0082207 | 7/2012 |
| KR | 10-2015-0075691 | 7/2015 |
| KR | 10-2017-0082036 | 7/2017 |
| KR | 10-2018-0014625 | 2/2018 |
| KR | 10-2018-0017977 | 2/2018 |

OTHER PUBLICATIONS

Written Opinion of the ISA for PCT/KR2020/005376 dated Jul. 22, 2020, 5 pages.

* cited by examiner

400

| 3 | 9 | 17 | 9 | 3 | 2 |
|---|---|---|---|---|---|
| 10 | 70 | 119 | 101 | 30 | 4 |
| 21 | 124 | 129 | 131 | 79 | 6 |
| 13 | 94 | 128 | 116 | 44 | 5 |
| 3 | 14 | 33 | 23 | 8 | 2 |

| | | | | | | | Strength |
|---|---|---|---|---|---|---|---|
| 0 | 0 | 0 | 0 | 0 | 0 | 0 | 0 |
| 0 | 9 | 17 | 9 | 0 | 0 | 0 | 35 |
| 10 | 70 | 119 | 101 | 30 | 0 | 2 | 32 |
| 21 | 124 | 129 | 131 | 79 | 6 | 0 | 490 |
| 13 | 94 | 128 | 116 | 44 | 5 | -2 | 398 |
| 0 | 14 | 33 | 23 | 8 | 0 | -1 | 77 |
| 0 | 0 | 0 | 0 | 0 | 0 | 3 | 3 |

413

Strength  44  311  426  380  161  11  2

ELECTRONIC DEVICE, OPERATION METHOD THEREOF, AND NON-TRANSITORY STORAGE MEDIUM

CROSS-REFERENCE TO RELATED APPLICATIONS

This application is a continuation of International Application No. PCT/KR2020/005376 designating the United States, filed on Apr. 23, 2020, in the Korean Intellectual Property Receiving Office and claiming priority to Korean Patent Application No. 10-2019-0047563, filed on Apr. 23, 2019, in the Korean Intellectual Property Office, the disclosures of which are incorporated by reference herein in their entireties.

BACKGROUND

Field

The disclosure relates to an electronic device for identifying a position of a display and an operation method in the electronic device.

Description of Related Art

Recently, electronic devices have been developed in various forms for the convenience of users.

The electronic device may receive user information through various types of input means for an input interface. Such input means are being developed in various forms. The electronic device includes a touch circuit or a touchscreen in the form of an input/output device capable of performing history and display of information through a screen of a single display.

The electronic device may detect a user input on a display in the form of an input/output device and may identify the position of the detected user input.

The electronic device needs to accurately identify the position of the user input to some of the objects included in the user interface of the application displayed on the display.

However, the electronic device generates and processes coordinate information only in a designated coordinate generation scheme without considering the user's various use environments, e.g., objects of a specific application requiring accuracy. Accordingly, if the electronic device detects a user input to specific objects requiring accuracy, the accuracy of coordinate information generated according to the user input is lowered, so it is difficult to identify the accurate position of the input, and a function that is not intended by the user may be executed.

SUMMARY

Embodiments of the disclosure provide an electronic device, a method, and a non-transitory storage medium for identifying a position of a display according to a user input in a partial screen area of the display using a plurality of set algorithms.

According to various example embodiments, an electronic device comprises: a display including a touchscreen, a memory, and at least one processor electrically connected with the display and the memory. The memory may store instructions which, when executed, cause the at least one processor to: store information for a plurality of algorithms for identifying a position of an input in the memory, identify a first algorithm corresponding to a first screen area, the first screen area being a partial screen area of the touchscreen, from among the plurality of algorithms, identify a first input for the first screen area, and obtain touch coordinate information on the touchscreen corresponding to a position according to the first input using the first algorithm.

According to various example embodiments, a method for operating an electronic device may comprise: storing information for a plurality of algorithms for identifying a position of an input in the memory, identifying a first algorithm corresponding to a first screen area, the first screen area being a partial screen area of the touchscreen, from among the plurality of algorithms, identifying a first input for the first screen area, and obtaining touch coordinate information on the touchscreen corresponding to a position according to the first input using the first algorithm.

According to various example embodiments, a non-transitory computer-readable storage medium having stored thereon a program including executable instructions that, when executed by at least one processor, cause the processor to perform operations comprising: storing information for a plurality of algorithms for identifying a position of an input in the memory, identify a first algorithm corresponding to a first screen area, the first screen area being a partial screen area of the touchscreen, from among the plurality of algorithms, identify a first input for the first screen area, and obtain touch coordinate information on the touchscreen corresponding to a position according to the first input using the first algorithm.

According to various example embodiments of the disclosure, an electronic device according to various embodiments may set a plurality of algorithms for identifying the position of the user input and identify the position according to the user input detected from a partial screen area using the algorithm corresponding to the partial screen area of the display among the plurality of algorithms to more accurately identify the position of the display according to the user input, thus preventing and/or avoiding a function unintended by the user from being executed.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 4A and 4B are diagrams illustrating an example for identifying a position according to a user input according to various embodiments;

FIGS. 5A and 5B are diagrams illustrating an example for identifying a position according to a user input in an electronic device according to various embodiments;

DETAILED DESCRIPTION

Figure 1:
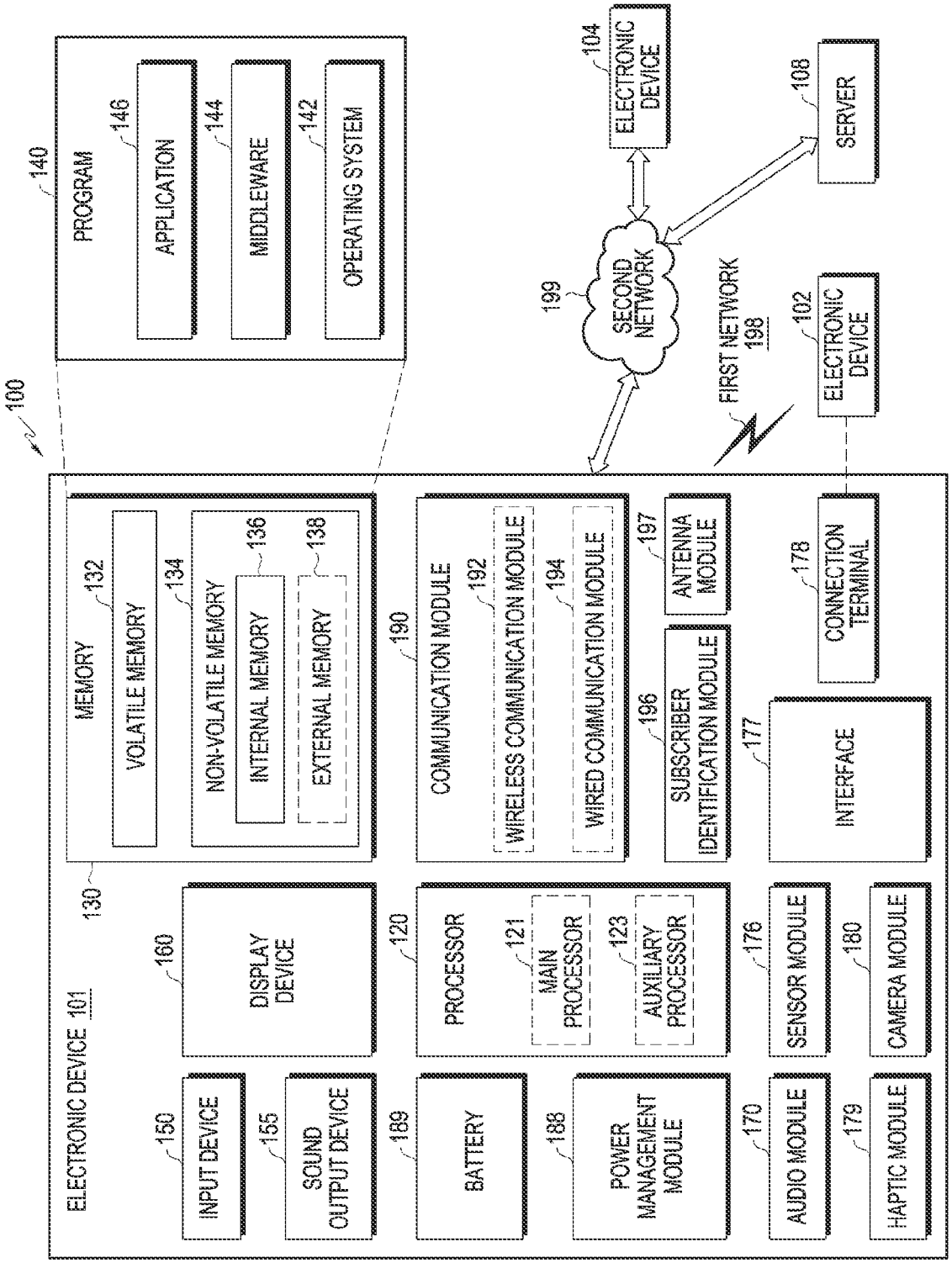
FIG. 1 is a diagram illustrating an example electronic device in a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include one or more antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
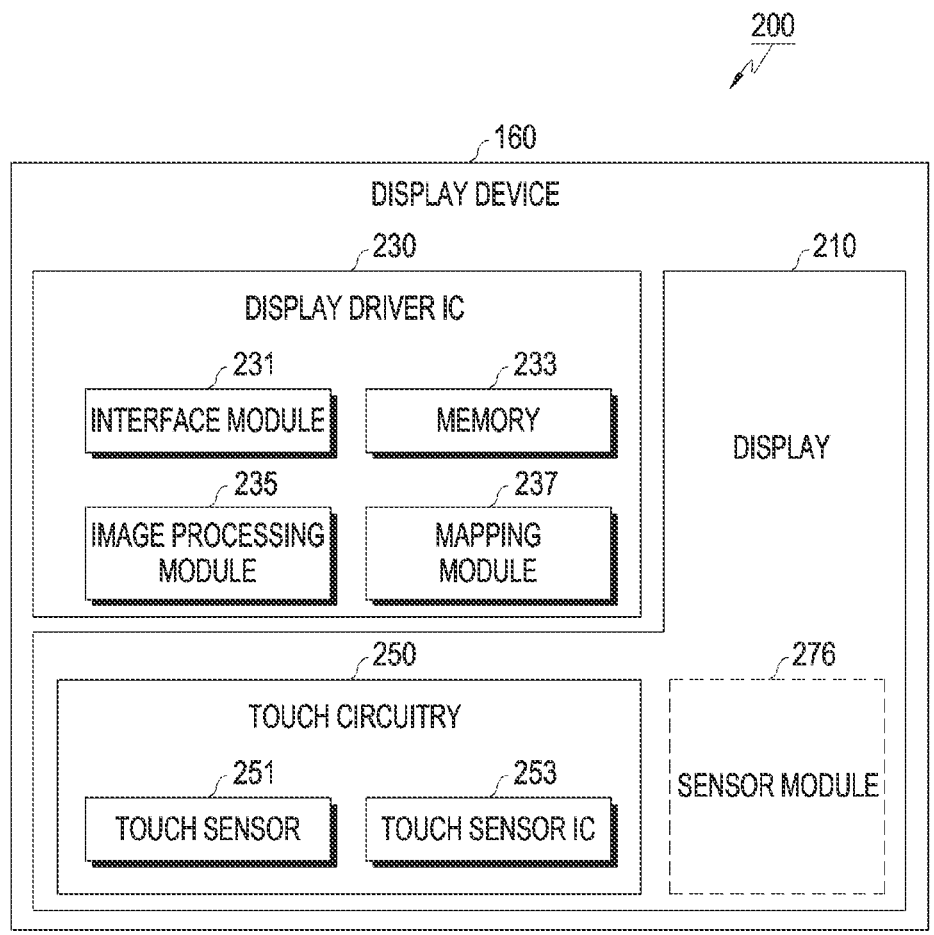
FIG. 2 is a block diagram illustrating an example configuration of a display device according to various embodiments.

FIG. 2 is a block diagram 200 illustrating an example configuration of the display device 160 according to various embodiments. Referring to FIG. 2, the display device 160 may include a display 210 and a display driver integrated circuit (DDI) 230 to control the display 110. The DDI 230 may include an interface module 231, memory 233 (e.g., a buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 220 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 276 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 151. The touch sensor IC 253 may control the touch sensor 251 to sense a touch input or a hovering input with respect to a certain position on the display 210. To achieve this, for example, the touch sensor IC 253 may detect (e.g., measure) a change in a signal (e.g., a voltage, a quantity of light, a resistance, or a quantity of one or more electric charges) corresponding to the certain position on the display 210. The touch sensor IC 253 may provide input information (e.g., a position, an area, a pressure, or a time) indicative of the touch input or the hovering input detected to the processor 220. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 276 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 276 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 276 embedded in the display device 160 includes a pressure sensor, the pressure sensor may obtain pressure information corresponding to a touch input received via a partial or whole area of the display 210. According to an embodiment, the touch sensor 251 or the sensor module 276 may be disposed between pixels in a pixel layer of the display 210, or over or under the pixel layer.

Various components of the electronic device have been described through the electronic device of FIG. 1, and various components of the display device have been described through the display device of FIG. 2, according to various embodiments of the disclosure. However, in various embodiments, not all of the components of the electronic device and the components of the display device illustrated in FIGS. 1 and 2 are essential components, and the electronic device and the display device may be implemented with more or less components than those illustrated. The positions of the components of the electronic device and the display device described above in connection with FIG. 1 may be varied according to various embodiments.

Hereinafter, components for identifying a position according to a user input identified in a specific position (e.g., in a screen area of the touchscreen) of the display 210 in the electronic device 101 are described in greater detail below with reference to FIGS. 1 and 2, according to various embodiments.

In various embodiments described below, the plurality of algorithms may be described as including a peak point-based algorithm (e.g., a first algorithm) and a center point-based algorithm (e.g., a second algorithm). It may be described that the plurality of algorithms may further include an algorithm (e.g., a third algorithm) that combines the peak point-based algorithm and the center point-based algorithm.

Figure 3:
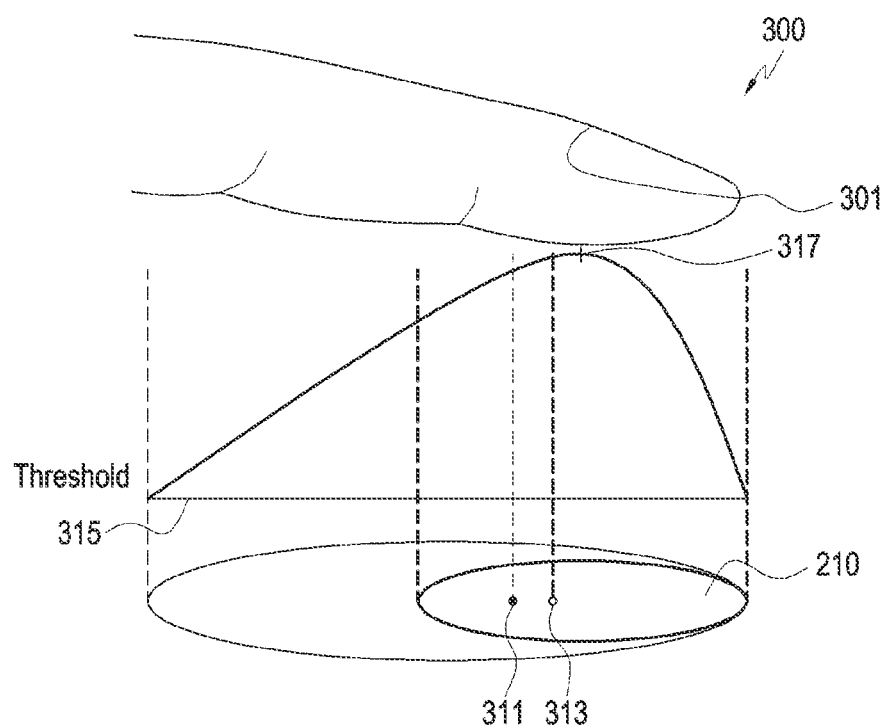
FIG. 3 is a diagram illustrating an example for identifying a position according to a user input in an electronic device according to various embodiments.

FIG. 3 is a diagram 300 illustrating an example for identifying a position according to a user input in an electronic device according to various embodiments.

Referring to FIGS. 1, 2, and 3, the electronic device 101 or the at least one processor 120 according to various embodiments may include a touch sensor IC 253. The touch sensor IC 253 may identify a user input 301 (e.g., a touch input or a hovering input) in the screen area of the display 210.

According to various embodiments, the processor 120 may obtain touch coordinate information (e.g., coordinate values) on the touchscreen, as position information according to the user input 301, using the at least one sensor and may identify the position of the user input based on the touch coordinate information.

According to various embodiments, the processor 120 may set a plurality of algorithms for identifying a position according to a user input in a partial screen area of the touchscreen of the display 210 and may store information regarding the plurality of set algorithms in the memory 130. According to various embodiments, the processor 120 may set at least one of the user interface of the display 210, the screen area of the display 210, information related to the type of application, and information related to the use environment, as the information related to the algorithm, map the set algorithm-related information to the plurality of set algorithms, and store them in the memory 130. The information related to the user interface may include information related to characteristics of objects included in the user interface. The information related to the characteristics of the objects may include information for determining whether an object is one for which accuracy is required. The object for which the accuracy is required may be, e.g., an object related to at least one of a keyboard, a small button, and document editing or drawing. According to various embodiments, the processor 120 may designate an algorithm corresponding to each application among the plurality of algorithms and may map information related to the designated algorithm to the application and store them in the memory 130.

According to various embodiments, the processor 120 may identify an algorithm corresponding to the screen area of the display 210 (or touchscreen) among the plurality of algorithms. The processor 120 may identify a user input to the screen area and may obtain the position information for the user input on the display 210 using the identified algorithm. The processor 120 may identify the position of the user input based on the obtained position information. The screen area may correspond to the user interface of the application. The screen area may be the entire area or at least a partial area of the user interface displayed on the display 210. The processor 120 may generate touch coordinate information (e.g., first coordinate information 311 and second coordinate information 313) on the touchscreen, as the position information for the user input to the screen area of the display 210 using at least one algorithm among a plurality of preset algorithms.

According to various embodiments, the processor 120 may identify a peak point-based algorithm (e.g., a first algorithm) from among the plurality of algorithms corresponding to the first screen area of the display. When a user input (e.g., a first user input) is received at the first screen area, the processor 120 may obtain position information according to the user input received from the first screen area using the identified peak point-based algorithm. Here, the screen area may correspond to, e.g., the user interface (e.g., a first user interface) of the first application.

According to various embodiments, the processor 120 may identify a center point-based algorithm (e.g., a second algorithm) corresponding to a second screen area of the display that is different from the first screen area from among the plurality of algorithms. When a user input (e.g., a second user input) is received at the second screen area, the processor 120 may obtain position information according to the user input using the center point-based algorithm. Here, the center point-based algorithm may be different from the peak point-based algorithm. According to various embodiments, the second screen area may correspond to the user interface (e.g., a second user interface) of the first application or the second application. According to various embodiments, the second screen area may be another part of the user interface (e.g., a first user interface) corresponding to the first screen area.

According to various embodiments, the processor 120 may divide the screen areas of the display 210 based on characteristics of objects displayed on the user interface of the executed application. If the screen areas are divided, the processor 120 may identify algorithms individually corresponding to the divided areas from among the plurality of algorithms. For example, the processor 120 may identify the peak point-based algorithm corresponding to the first screen area of the executed application and may identify the center point-based algorithm corresponding to the second screen area for the executed application. According to various embodiments, if a second application is executed while the first application is executed, the processor 120 may divide the screen of the display 210 into two or more screen areas and may identify the algorithm corresponding to the user interface of the second application. For example, the processor 120 may identify the peak point-based algorithm corresponding to the first screen area for the first application and may identify the center point-based algorithm corresponding to the second screen area for the second application. As another example, the processor 120 may identify the center point-based algorithm corresponding to the first screen area for the first application and may identify the peak-point based algorithm corresponding to the second screen area for the second application.

According to various embodiments, the processor 120 may detect a grip by the user's hand using at least one sensor of the electronic device 101 by the user and may divide the screen areas of the display 210 based on information for the detected grip. The processor 120 may identify the algorithm corresponding to each divided area. According to various embodiments, the processor 120 may identify the position of the gripped hand, that is, the shape of the grip, based on the information for the grip and may identify a touchable screen area of the display 210 based on the identified grip shape, e.g., according to the user's one-handed use (e.g., one-handed mode). For example, the processor 120 may identify the peak point-based algorithm corresponding to the screen area of the touched portion of the display 210 based on information related to the detected grip and may identify the center point-based algorithm corresponding to the remaining screen area except for the screen area of the touched portion. As another example, the processor 120 may identify the center point-based algorithm corresponding to the screen area of the touched portion and may identify the peak-point based algorithm corresponding to the remaining screen area. According to various embodiments, the processor 120 may divide the screen areas of the display 210 based on the characteristics of the objects displayed on the user interface of the executed application if the identified grip shape is changed to another grip shape or if no grip is detected.

According to an embodiment, if the display 210 is folded, the processor 120 may divide the screen areas of the display 210 based on the folded state of the display 210. The processor 120 may identify the algorithm corresponding to each divided area. For example, the processor 120 may identify the peak point-based algorithm corresponding to the first area with respect to the folded portion of the display 210 and may identify the centroid-based algorithm corresponding to the second area. According to various embodiments, the processor 120 may identify the folded shape and may divide at least two or more screen areas of the display 210 based on the identified folded shape. For example, the processor 120 may identify the peak point-based algorithm corresponding to the screen area of the display 210 of the first surface of the electronic device based on the folded shape and identify the center point-based algorithm corresponding to the screen area of the display 210 of the second surface of the electronic device.

FIGS. 4A and 4B are diagrams 400 illustrating an example for identifying a position according to a user input according to various embodiments.

Referring to FIGS. 3, 4A, and 4B, if a user input 301 is detected, the processor 120 according to various embodiments may generate coordinate information 311 according to a center point-based algorithm (e.g., a second algorithm) corresponding to the screen area in which the user input is detected. The center point-based algorithm may include an algorithm that generates the coordinate information 311 by identifying the degree of specific gravity of each column or row based on detection values greater than or equal to a reference value (threshold) 315 (e.g., 5) in the square matrix 401 using a center of gravity scheme. According to an embodiment, as illustrated in FIG. 4A, the processor 120 may identify values 411 in which the detection value of the user input 301 is greater than or equal to the reference value 315 (e.g., 5) in the square matrix 401. The reference value 315 may be previously designated or may be designated as a value changed as the user adjusts the touch sensitivity. As illustrated in FIG. 4B, the processor 120 may identify strengths for the nodes of the square matrix 403 based on the identified detection values 411 and may identify a unique central position P for the nodes (1, 2, 3). Here, the node may refer, for example, to one row or one column of the square matrix 403. The unique central position P may be calculated by a general center of gravity calculation scheme, so a detailed calculation method will be omitted. The processor 120 may generate the coordinate information 413 based on the identified unique central position values P and the sensitivity values S as shown in Equation 1 below. Although Equation 1 below is an example of calculating coordinate values based on a 3×3 matrix, other types of matrices are also possible.

$$\text{coordinate} = \frac{P_1 * S_1 + P_2 * S_2 + P_3 * S_3}{S_1 + S_2 + S_3} \qquad \text{[Equation 1]}$$

Figures 5A, 5B:
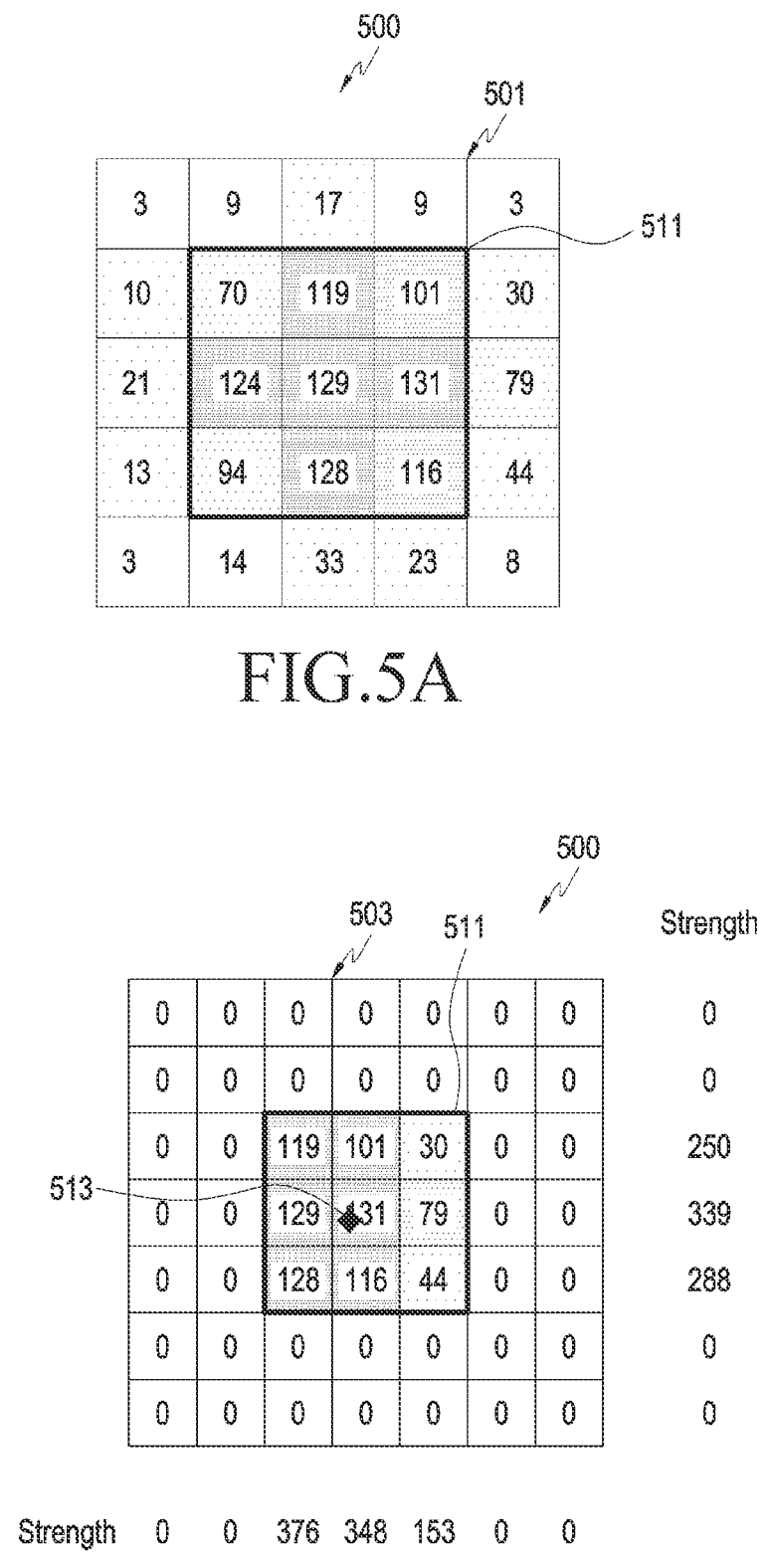
Figure 6:
FIG. 6 is a diagram illustrating an example for identifying a position according to a user input in an electronic device according to various embodiments.

FIGS. 5A and 5B are diagrams 500 illustrating an example for identifying a position according to a user input in an electronic device according to various embodiments. FIG. 6 is a diagram 600 illustrating an example for identifying a position according to a user input in an electronic device according to various embodiments.

Referring to FIGS. 3, 5A, 5B, and 6, if a user input 301 is detected, the processor 120 according to various embodiments may generate coordinate information 313 according to a peak point-based algorithm (e.g., a first algorithm) corresponding to the screen area in which the user input 301 is detected. The peak-based algorithm may include an algorithm for generating coordinate information close to the peak point 317 among the detected values and may be an algorithm that uses at least one of a 3×3 matrix (first scheme) 511, a 5×5 matrix (second scheme), or a scheme (third scheme) for changing the reference value. Here, the reference value may be previously designated or may be designated as a value changed as the user adjusts the touch sensitivity.

According to an embodiment, as illustrated in FIG. 5A, the processor 120 may identify detection values of a 3×3 matrix 511 in the square matrix 501 by applying a peak point-based algorithm using the 3×3 matrix 511. As illustrated in FIG. 5B, the processor 120 may use only the detection values of the 3×3 matrix 511 identified in the square matrix 503 while setting all of the remaining values to 0's. The processor 120 may identify unique central position values P of the nodes and sensitivity values S of the nodes using only the detection values of the 3×3 matrix 511 and may generate the coordinate information 313 using Equation 1 based on the identified unique central position values P and the identified sensitivity values S. As illustrated in FIG. 5B, the coordinate information 313 may be generated as a coordinate value of the position 513 close to the maximum value (e.g., 131) corresponding to the peak point 317.

According to an embodiment, as illustrated in FIG. 6, the processor 120 may apply a peak point-based algorithm using, e.g., a 5×5 matrix, identifying detection values of the 5×5 matrix in the square matrix 601. The processor 120 may identify unique central position values P of the nodes and sensitivity values S of the nodes using only the detection values of the 5×5 matrix and may generate the second coordinate information 313 using Equation 1 based on the identified unique central position values P and the identified sensitivity values S.

Figure 7:
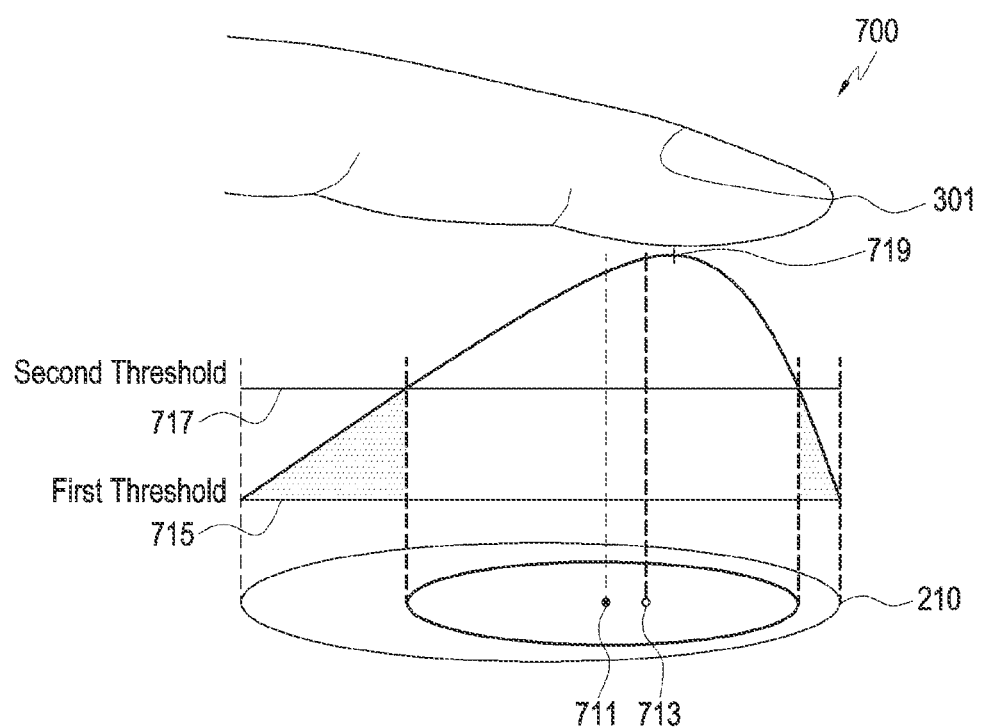
FIG. 7 is a diagram illustrating an example for identifying a position according to a user input in an electronic device according to various embodiments.
Figure 8:
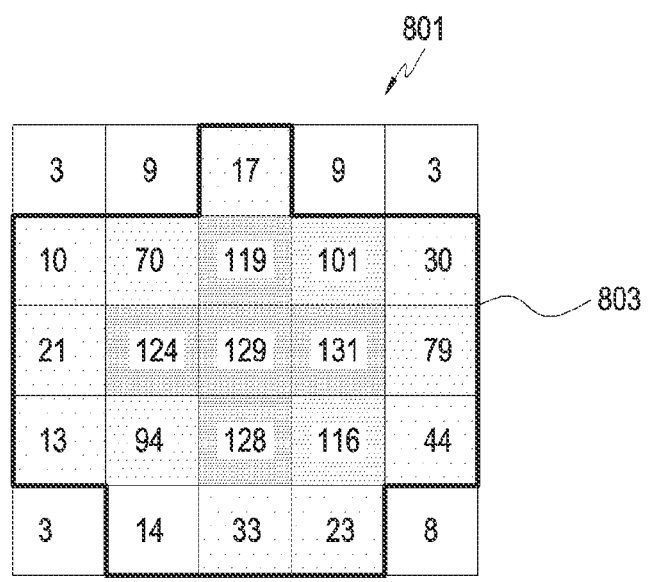
FIG. 8 is a diagram illustrating an example for identifying a position according to a user input in an electronic device according to various embodiments.

FIG. 7 is a diagram 700 illustrating an example for identifying a position according to a user input in an electronic device according to various embodiments. FIG. 8 is a diagram 800 illustrating an example for identifying a position according to a user input in an electronic device according to various embodiments.

Referring to FIGS. 7 and 8, the processor 120 of the electronic device 101 according to various embodiments may generate coordinate information 713 using peak point-based algorithms (e.g., the first algorithm) using the scheme (third scheme) of changing the reference value. The coordinate information 713 may include coordinate values of positions closer to the peak point (e.g., the maximum detection value) 719 as compared to the coordinate information 711 generated using the center point-based algorithm.

According to an embodiment, as illustrated in FIG. 7, the processor 120 may change the first reference value 715, which is the reference value (e.g., 5) in the square matrix (e.g., the square matrix 401 of FIG. 4A) on the display 210, into a second reference value (e.g., 10) 717. Here, the second reference value may be previously designated or may be designated as a value changed as the user adjusts the touch sensitivity. The processor 120 may identify detection values 803 that are equal to or greater than the second reference value 717 in the square matrix 801 by applying the peak point-based algorithm of the scheme (third scheme) of changing the reference value. The processor 120 may generate coordinate information 713 using only the identified detection values. For example, the processor 120 may generate the coordinate information 713 using Equation 1 above.

Figure 9A:
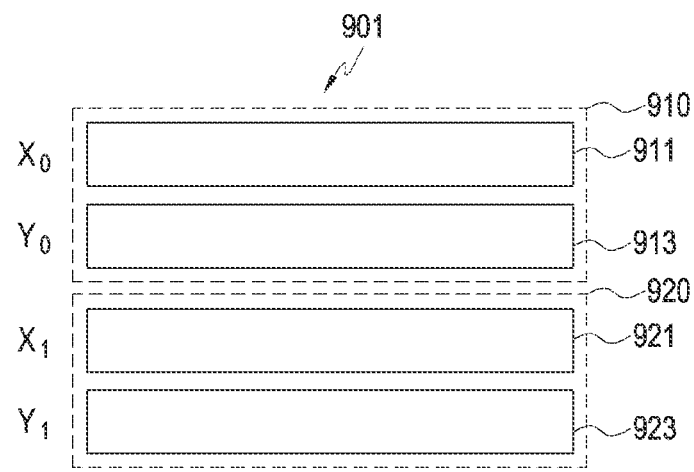
FIGS. 9A, 9B, and 9C are diagrams illustrating examples of coordinate information stored in a memory according to various embodiments.
Figure 9B:
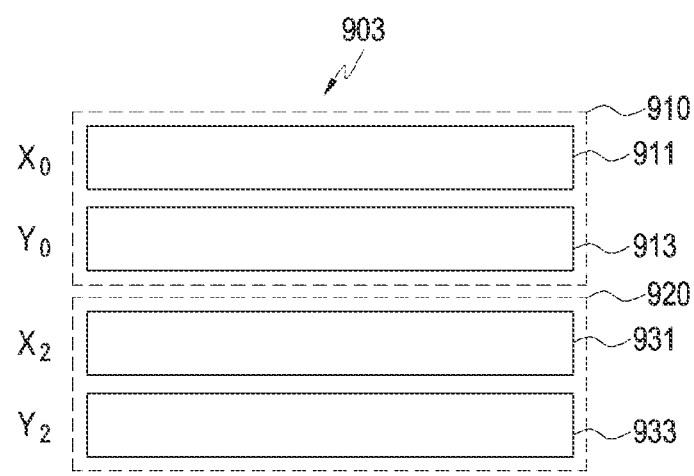
Figure 9C:
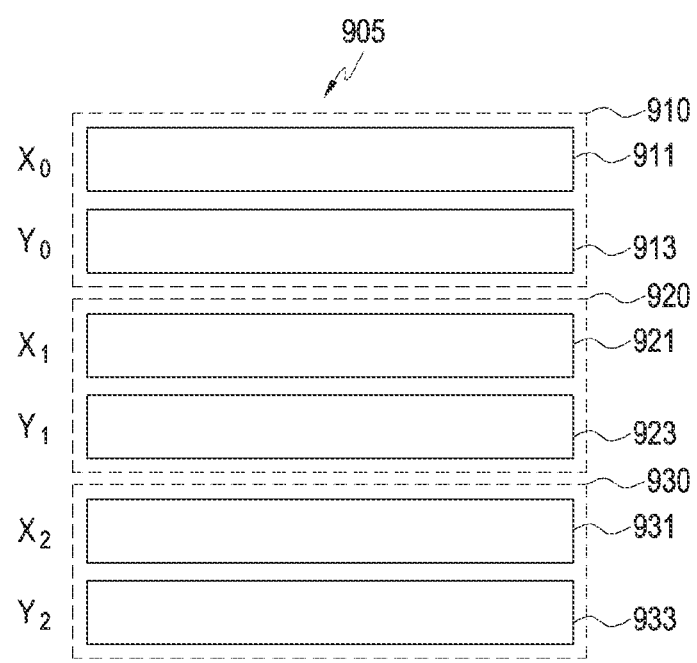

FIGS. 9A, 9B, and 9C are diagrams illustrating examples of coordinate information stored in a memory according to various embodiments.

According to an embodiment, as illustrated in FIG. 9A, the processor 120 may store the coordinate information (e.g., coordinate information 311 of FIG. 3) ($X_0$, $Y_0$) (911, 913) generated by the center point-based algorithm in a first memory area 910 of the memory 130. The processor 120 may store the coordinate information (e.g., coordinate information 313 of FIG. 3) ($X_1$, $Y_1$) (921, 923) generated by the peak point-based algorithm of a 3×3 matrix scheme (first scheme) in a designated second memory area 920.

According to an embodiment, as illustrated in FIG. 9B, the processor 120 may store the coordinate information (e.g., coordinate information 311 of FIG. 3) ($X_0$, $Y_0$) (911, 913) generated by the center point-based algorithm in a first memory area 910 of the memory 130. The processor 120 may store the coordinate information (e.g., coordinate information 313 of FIG. 3) ($X_2$, $Y_2$) (931, 933) generated using the peak point-based algorithm of the 5×5 matrix scheme (second scheme) or the third algorithm in the second memory area 920. The third algorithm may be an algorithm combining the 5×5 matrix scheme or the 5×5 matrix scheme and the scheme for changing the reference value.

According to an embodiment, as illustrated in FIG. 9C, the processor 120 may store the coordinate information (e.g., coordinate information 311 of FIG. 3) ($X_0$, $Y_0$) (911, 913) generated by the center point-based algorithm in the designated first memory area 910 of the memory 130. The processor 120 may store the coordinate information (e.g., coordinate information 313 of FIG. 3) ($X_1$, $Y_1$) (921, 923) generated using the peak point-based algorithm of the 3×3 matrix scheme (first scheme) in the designated second memory area 920. The processor 120 may store the coordinate information (e.g., coordinate information 313 of FIG. 3) ($X_2$, $Y_2$) (931, 933) generated using the peak point-based algorithm of the 5×5 matrix scheme (second scheme) or the scheme of changing the reference value (third scheme) or the third algorithm in a designated third memory area 930 of the memory 130.

According to any one of various example embodiments, an electronic device (e.g., the first electronic device 101) may comprise: a display (e.g., the display 210) including a touchscreen, a memory (e.g., the memory 130), and at least one processor (e.g., the processor 120) electrically connected with the display and the memory. The memory may store instructions which, when executed, cause the processor to: identify a peak point-based algorithm (hereinafter, referred to as a first algorithm) corresponding to a first screen area which is a partial screen area of the touchscreen from among the plurality of algorithms, identify a first input for the first screen area, and obtain touch coordinate information on the touchscreen corresponding to a position according to the first input using the first algorithm.

According to various example embodiments, the memory may further store instructions which, when executed, cause the at least one processor to: identify a center point-based algorithm (hereinafter, referred to as a second algorithm) corresponding to a second screen area which is a partial screen area of the touchscreen and is different from the first screen area, from among the plurality of algorithms, identify a second input for the second screen area, and obtain position information for the second input using the second algorithm.

According to various example embodiments, the first screen area may correspond to a first user interface of a first application, and the second screen area may correspond to a second user interface of the first application or a second application.

According to various example embodiments, the first screen area may correspond to a portion of a first user interface of a first application, and the second screen area may correspond to another portion of the first user interface.

According to various example embodiments, the first algorithm may be configured to obtain the position information based on detection values identified in a square matrix having a designated size or detection values identified as greater than or equal to a changed second reference value. The second algorithm may be configured to obtain the position information based on detection values identified as greater than or equal to a first reference value on the touchscreen according to the user input.

According to various example embodiments, the memory may further store instructions which, when executed, cause the at least one processor to identify a grip position using at least one sensor, identify the first screen area of the touchscreen based on the identified grip position, and identify a remaining area other than the first screen area as a second screen area of the touchscreen.

According to various example embodiments, the memory may further store instructions which, when executed, cause the at least one processor to identify a folding of the display, identify a folded portion of the display as the first screen area of the display based on the identified folding of the display, and identify a remaining flat portion other than the first screen area as a second screen area of the display. The second screen area may correspond to a user interface of a second application different from a user interface of a first application corresponding to the first screen area.

Operational procedures of the electronic device as described above are described below in greater detail with reference to the accompanying drawings.

Figure 10:
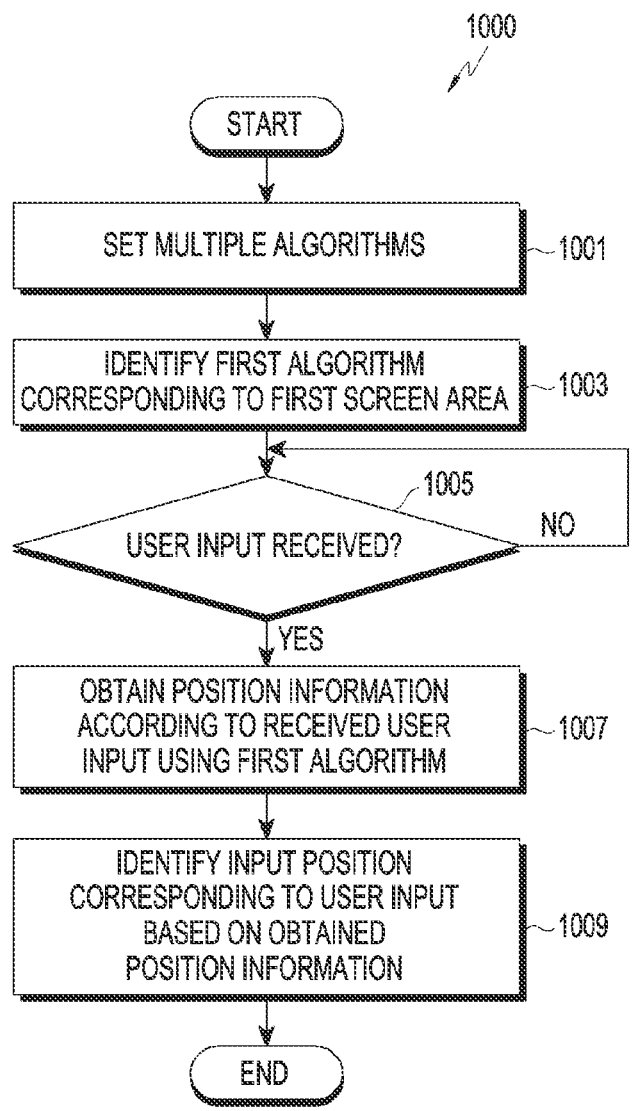
FIG. 10 is a flowchart illustrating an example operation of an electronic device according to various embodiments.

FIG. 10 is a flowchart 1000 illustrating an example operation of an electronic device according to various embodiments.

Referring to FIG. 10, an electronic device (e.g., the electronic device 101 of FIG. 1) according to various embodiments may store information for a plurality of algorithms for identifying the position of a user input in the memory in operation 1001. The plurality of algorithms may include a peak point-based algorithm (e.g., the first algorithm) and a center point-based algorithm (e.g., the second algorithm) using at least one of a designated matrix (a 3×3 matrix or a 5×5 matrix) or a reference value change scheme. Further, the plurality of algorithms may be set when the electronic device is manufactured or before a specific application is executed on the electronic device. According to an embodiment, in the electronic device, e.g., a first algorithm and a second algorithm may be previously set. The electronic device may set the center point-based algorithm corresponding to a user interface according to selection of an object not requiring accuracy. The electronic device may set the peak point-based algorithm corresponding to a user interface according to selection of an object requiring accuracy.

In operation 1003, the electronic device may identify the peak point-based algorithm corresponding to the screen area (hereinafter, referred to as a first screen area) of the display from among the plurality of algorithms. The screen area may be the entire area or at least a partial area of the user interface displayed on the display. According to an embodiment, the electronic device may identify the peak point-based algorithm if the first screen area for the user interface of the application executed while the specific application is executed includes objects requiring accuracy.

In operation 1005, the electronic device may identify whether a user input is received through the display. As a result of identification, if a user input is received, the electronic device may perform operation 1007 and, if no user input is received, the electronic device may continue to perform operation 1005.

In operation 1007, the electronic device may obtain position information according to the received user input using the identified peak point-based algorithm. In operation 1009, the electronic device may identify the input position corresponding to the user input based on the obtained position information. According to an embodiment, the electronic device may obtain position information (e.g., coordinate information including the X-axis value and the Y-axis value) using the peak point-based algorithm and may identify position information for the position where the user input was detected based on the generated position information. The electronic device may execute a function related to the object displayed in the identified position.

According to the embodiment, after performing the operation of identifying the first algorithm in operation 1003, the electronic device performs the operation of identifying whether a user input is received in operation 1005. However, according to an embodiment, the electronic device may perform operation 1005 of FIG. 10 before operation 1003. In response to receiving the user input, the electronic device may identify the algorithm corresponding to at least one of, e.g., the screen area of the display, the object displayed on the screen area, or the type of the application executed on the screen area.

Figure 11A:
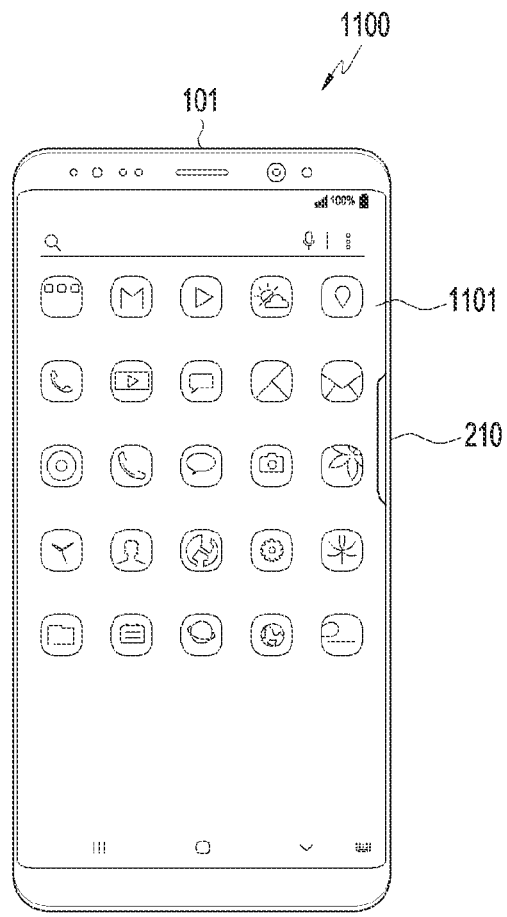
FIGS. 11A and 11B are diagrams illustrating examples of an execution screen of an application executed on an electronic device, according to various embodiments.
Figure 11B:
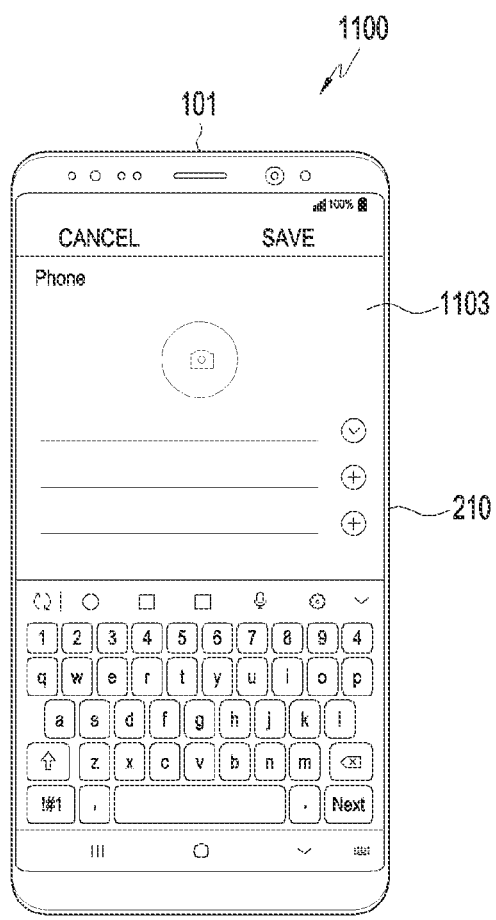

FIGS. 11A and 11B are diagrams 1100 illustrating examples of an execution screen of an application executed on an electronic device, according to various embodiments.

According to an embodiment, if the first application, e.g., the first user interface (e.g., a home screen including icons) 1101 as illustrated in FIG. 11A, is displayed on the display 210, the electronic device may identify it as a user interface not requiring accuracy and identify the center point-based algorithm corresponding to the first user interface 1101. The electronic device may obtain position information (e.g., the first position information 311 of FIG. 3) according to the user input using the identified center point-based algorithm.

According to an embodiment, if a second user interface 1103 including a function of using a keyboard is displayed on the display 210 as illustrated in FIG. 11B, the electronic device may identify the peak point-based algorithm corresponding to the second user interface 1103. The electronic device may obtain position information (e.g., the second position information 313 of FIG. 3) according to the user input using the identified peak point-based algorithm.

Figure 12:
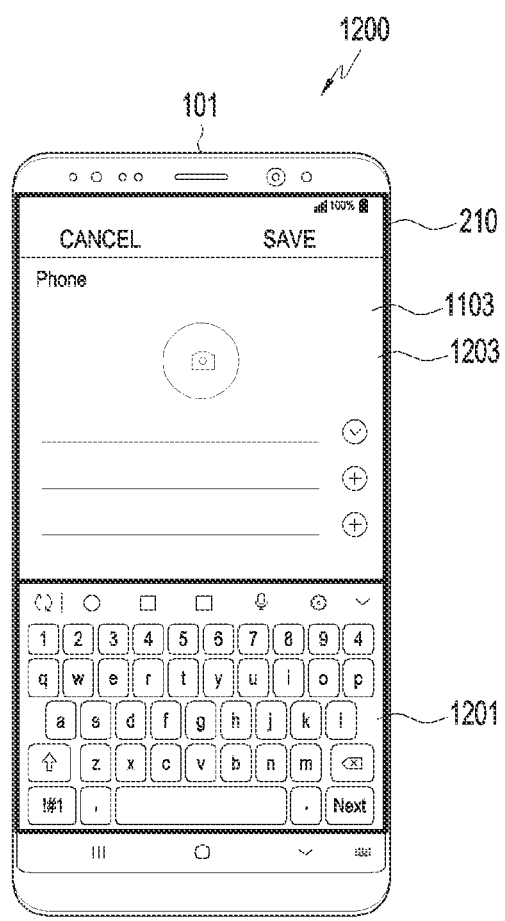
FIG. 12 is a diagram illustrating an example of a screen of an electronic device according to various embodiments.

FIG. 12 is a diagram 1200 illustrating an example of a screen of an electronic device according to various embodiments.

Referring to FIG. 12, according to an embodiment, the electronic device 101 may divide the first screen area 1201 of the second user interface 1103 displayed on the display 210 from the second screen area 1203. Here, the first screen area 1201 may be an area including objects requiring accuracy. The second screen area 1203 may be an area including objects not requiring accuracy. The second screen area 1203 may be a portion of the second user interface 1103. The electronic device 101 may identify the peak point-based algorithm corresponding to the first screen area 1201 and may identify the center point-based algorithm corresponding to the second screen area 1203. When a user input to the first screen area 1201 is identified, the electronic device 101 may obtain position information according to the user input using the peak point-based algorithm. When a user input to the second screen area 1203 is identified, the electronic device may obtain position information according to the user input using the center point-based algorithm.

According to an embodiment, if objects (e.g., buttons) with a predesignated size are included in the second screen area 1203, the electronic device 101 may identify the second screen area 1203 as an area including objects requiring accuracy. The electronic device 101 may identify the peak point-based algorithm corresponding to the second screen area 1203.

According to an embodiment, the electronic device 101 may divide the area, in which at least one specific button (e.g., v, +, + button) is displayed in the second screen area 1203, from the remaining area of the second screen area and identify only the specific button-displayed area as the area including accuracy-required objects. The electronic device 101 may identify the peak point-based algorithm corresponding to the specific button-displayed area in the second screen area 1203 and identify the center point-based algorithm corresponding to the remaining area.

Figure 13:
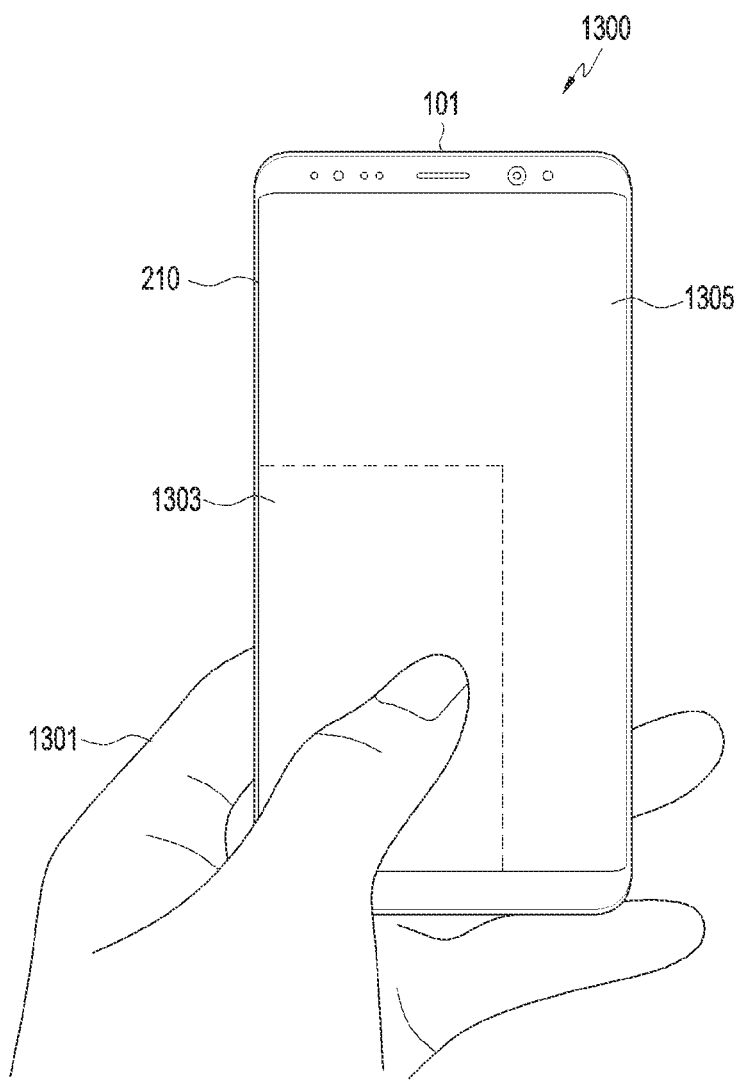
FIG. 13 is a diagram illustrating an example of a screen of an electronic device according to various embodiments.

FIG. 13 is a diagram 1300 illustrating an example of a screen of an electronic device according to various embodiments.

Referring to FIG. 13, according to various embodiments, the electronic device 101 may detect a grip by the user's hand using at least one sensor and may divide the screen areas of the display 210 based on information for the detected grip. According to various embodiments, the electronic device 101 may identify the shape of the user's grip on the electronic device 101 based on the grip information and divide the screen areas of the display 210 based on the identified grip shape. According to various embodiments, the electronic device 101 may divide the screen areas of the display 210 based on the characteristics of the objects displayed on the user interface of the executed application if the identified grip shape is changed to another grip shape or if no grip is detected.

According to an embodiment, the electronic device 101 may identify that, according to the grip detected on the display 210, the screen area touched by the user's hand 1301 or a partial screen area touchable by the user's one-handed use (e.g., a one-handed mode) is the first screen area 1303 and may identify that the remaining screen area other than the first screen area 1303 or a partial screen area different from the first screen area is the second screen area 1305. The second screen area 1305 may be an area away from the position of the user's hand 1301.

As an example, the electronic device 101 may identify the peak point-based algorithm corresponding to the first screen area 1303 and may identify the center point-based algorithm corresponding to the second screen area 1305. As another example, the electronic device 101 may identify the center point-based algorithm corresponding to the first screen area 1303 and may identify the peak point-based algorithm corresponding to the second screen area 1305.

When a user input to the first screen area 1303 is identified, the electronic device 101 may obtain position information according to the user input using the identified peak point-based algorithm.

When a user input to the second screen area 1305 is identified, the electronic device 110 may obtain position information according to the user input using the identified center point-based algorithm.

Figure 14:
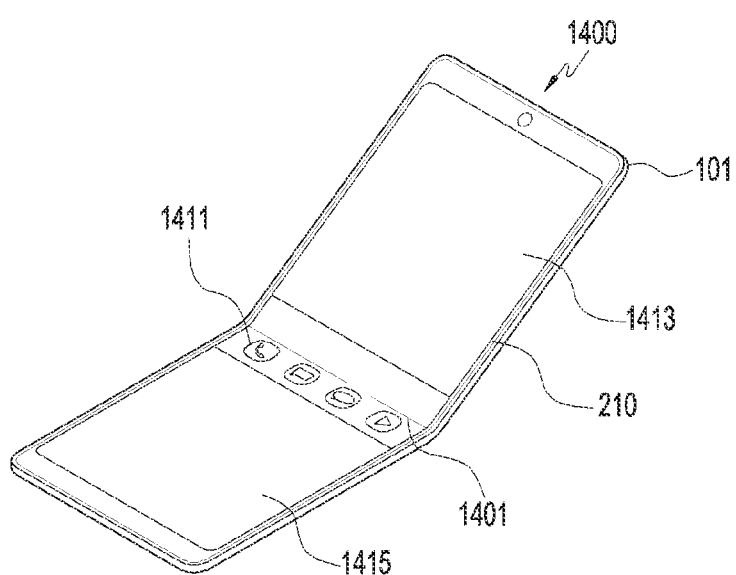
FIG. 14 is a perspective view illustrating an example of a screen of an electronic device according to various embodiments.

FIG. 14 is a perspective view 1400 illustrating an example of a screen of an electronic device according to various embodiments.

Referring to FIG. 14, if identifying a folding of the display 210, the electronic device 101 according to various embodiments may split the screen of the display 210 into at least two or more screen areas based on the fold of the display 210. According to an embodiment, the electronic device 101 may identify that the display 210 is folded along the reference line 1401. The electronic device 101 may identify an area adjacent to the reference line 1401 as the first screen area 1411 and may identify the remaining areas as the second screen area 1413 and the third screen area 1415. According to an embodiment, the electronic device 101 may divide two screen areas with respect to the reference line 1401.

For example, the electronic device 101 may identify a peak point-based algorithm (e.g., the first algorithm) corresponding to the first screen area 1411 and a center point-based algorithm (e.g., the second algorithm) corresponding to the second screen area 1413 and/or the third screen area 1415. As another example, the electronic device 101 may identify the center point-based algorithm corresponding to the first screen area 1411 and may identify the peak point-based algorithm corresponding to the second screen area 1415 and/or the third screen area 1415.

The electronic device 101 may identify the peak point-based algorithm corresponding to the first screen area 1411 and, upon detecting a user input on the first screen area 1411, obtain position information according to the user input using the peak point-based algorithm.

The electronic device 110 may identify the center point-based algorithm corresponding to the second screen area 1413 and/or the third screen area 1415 and, upon detecting a user input on the second screen area 1413 and/or the third screen area 1415, obtain position information according to the user input using the center point-based algorithm.

Figure 15A:
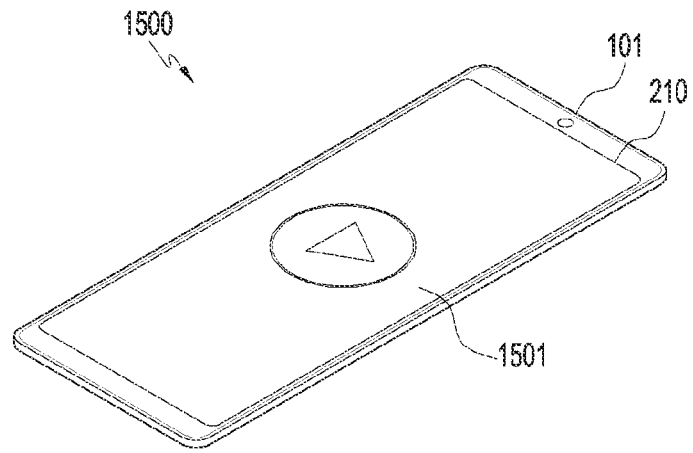
FIGS. 15A and 15B are perspective views illustrating examples of a screen of an electronic device according to various embodiments.
Figure 15B:
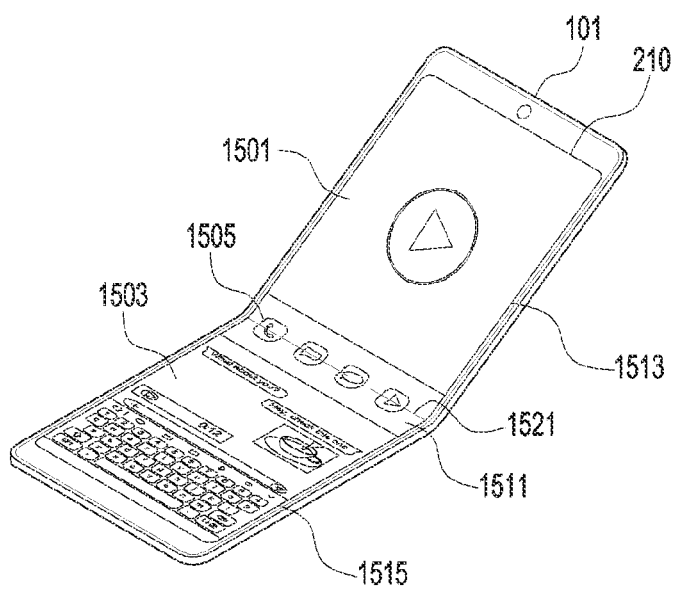

FIGS. 15A and 15B are perspective views 1500 illustrating examples of a screen of an electronic device according to various embodiments.

Referring to FIGS. 15A and 15B, the electronic device 101 according to various embodiments may execute a specific application (e.g., a video) and may display a user interface 1501 for the particular application on the display 210. The electronic device 101 may identify a center point-based algorithm (e.g., the second algorithm) corresponding to the user interface for the specific application and, upon receiving a user input detected on the user interface 1501, obtain position information according to the received user input using the center point-based algorithm (e.g., the first algorithm).

According to various embodiments, if the electronic device 101 identifies that the display 210 is folded in a state in which the specific application is executed, the electronic device 101 may split the screen of the display 210 into at least two or more screen areas based on the folding of the display 210. The electronic device 101 may identify an area adjacent to the reference line 1521 among the split areas as the first screen area 1511 and may identify the remaining areas as the second screen area 1513 and the third screen area 1515. The electronic device 101 may obtain position information according to the user input based on the identified algorithm corresponding to each of the screen areas 1511, 1513, and 1515.

According to an embodiment, if the folding of the display 210 is identified, the electronic device 101 may execute another application related to the specific application. The electronic device 101 may display a user interface 1503 for the other executed application in the third screen area 1515 and may display the user interface 1501 for the specific application in the second screen area 1513. The electronic device 101 may display another user interface 1505 related to another function related to the specific application in the first screen area 1511. According to various embodiments, the electronic device 101 may display a portion of the user interface 1501 or a portion of the user interface 1503 in the first screen area 1511.

According to an embodiment, the electronic device 101 may identify the peak point-based algorithm corresponding to the first screen area 1511 and may identify the center point-based algorithm corresponding to the second screen area 1513. The electronic device 101 may identify the peak point-based algorithm corresponding to the third screen area 1515.

According to an embodiment, the electronic device 101 may identify an algorithm corresponding to the user interface 1503 based on designated condition information corresponding to the displayed user interface 1503 or algorithm information mapped to the other application and stored. According to various embodiments, the peak point-based algorithm corresponding to the first screen area 1511 may be, e.g., an algorithm based on a 3×3 matrix scheme (first scheme), and the peak point-based algorithm corresponding to the third screen area 1515 may be, e.g., an algorithm based on a 5×5 matrix scheme (second scheme) or a reference value change scheme (third scheme). According to various embodiments, the peak point-based algorithms corresponding to the first screen area 1511 and the third screen area 1515 may be the same algorithm that is based on at least one of the 3×3 matrix scheme, a 5×5 matrix scheme, or the reference value change scheme.

According to an embodiment, when the folding of the display 210 is identified, the electronic device 101 may identify the algorithms corresponding to all of the split areas 1511, 1513, and 1517 as peak point-based algorithms. For example, the electronic device 101 may identify a peak point-based algorithm of the 3×3 matrix scheme corresponding to the first screen area 1511, a peak point-based algorithm of the 5×5 matrix scheme corresponding to the second screen area 1513, and a peak point-based algorithm of the reference value change scheme corresponding to the third screen area 1515.

According to an embodiment, the electronic device 101 may detect the folding angle of the first screen area 1511 using at least one sensor and may identify a designated algorithm corresponding to the detected folding angle. For example, if the detected folding angle is equal to or greater than a predesignated threshold angle, the electronic device 101 may change the previously identified algorithm (e.g., a center point-based algorithm) to another algorithm (e.g., a peak point-based algorithm). As another example, if the detected folding angle is equal to or greater than the predesignated threshold angle, and the previously identified algorithm is a peak point-based algorithm, the electronic device 101 may change the specific scheme (e.g., the 5×5 matrix scheme (second scheme)) identified in the peak point-based algorithm into another scheme (e.g., the 3×3 matrix scheme (first scheme) or the reference value change scheme (third scheme)).

According to various example embodiments, a method for operating an electronic device may comprise: storing information for a plurality of algorithms for identifying a position of an input in the memory, identifying a peak point-based algorithm (hereinafter, referred to as a first algorithm) corresponding to a first screen area, which is a partial screen area of the touchscreen, from among the plurality of algorithms, identifying a first input for the first screen area, and obtaining touch coordinate information on the touchscreen corresponding to a position according to the first input using the first algorithm.

According to various example embodiments, the method may further comprise identifying a center point-based algorithm (hereinafter, referred to as a second algorithm) corresponding to a second screen area, which is a partial screen area of the touchscreen and is different from the first screen area, from among the plurality of algorithms, identifying a second input for the second screen area, and obtaining position information for the second input using the second algorithm.

According to various example embodiments, the first screen area may correspond to a first user interface of a first application, and the second screen area may correspond to a second user interface of the first application or a second application.

According to various example embodiments, the first screen area may correspond to a portion of a first user interface of a first application, and the second screen area may correspond to another portion of the first user interface.

According to various example embodiments, the first algorithm may be configured to obtain the position information based on detection values identified in a square matrix having a designated size or detection values identified as greater than or equal to a changed second reference value. The second algorithm may be configured to obtain the position information based on detection values identified as greater than or equal to a first reference value on the touchscreen according to the input.

According to various example embodiments, the method may further comprise identifying a grip position using at least one sensor, identifying the first screen area of the touchscreen based on the identified grip position, and identifying a remaining area other than the first screen area as a second screen area of the touchscreen.

According to various example embodiments, the method may further comprise identifying a folding of the display, identifying a folded portion of the display as the first screen area of the display based on the identified folding of the display, and identifying a remaining flat portion other than the first screen area as a second screen area of the display. The second screen area may correspond to a user interface of a second application different from a user interface of a first application corresponding to the first screen area.

According to an example embodiment, at least a part of the device (e.g., modules or their functions) or method (e.g., operations) may be implemented as instructions stored in a non-transitory computer-readable storage medium e.g., in the form of a program module. The non-transitory computer-readable storage medium may be e.g., a memory (e.g., the memory 130 of FIG. 1). The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. The aforementioned hardware devices may be configured to operate as one or more software modules to carry out example embodiments of the disclosure, and vice versa.

According to various example embodiments, in a non-transitory storage medium, the program may include executable instructions that, when executed by a processor, enable the processor to store information for a plurality of algorithms for identifying a position of an input in the memory, identify a first algorithm corresponding to a first screen area, which is a partial screen area of the touchscreen, from among the plurality of algorithms, identify a first input for the first screen area, and obtain touch coordinate information on the touchscreen corresponding to a position according to the first input using the first algorithm.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device, comprising:
   a display including a touchscreen;
   a memory; and
   at least one processor electrically connected with the display and the memory,
   wherein the memory stores instructions which, when executed, cause the at least one processor to:
   store information for a plurality of algorithms for identifying a position of an input in the memory;
   identify a first screen area of the touchscreen, the first screen area being a partial screen area of the touchscreen, based on a grip position identified using at least one sensor or based on a folded portion of the display; and
   identify a remaining area other than the first screen area as a second screen area of the touchscreen,
   identify a first algorithm corresponding to the first screen area from among the plurality of algorithms;
   identify a first input for the first screen area; and
   obtain touch coordinate information on the touchscreen corresponding to a position according to the first input using the first algorithm.

2. The electronic device of claim 1, wherein the instructions, when executed, further cause the at least one processor to:
   identify a second algorithm corresponding to the second screen area, the second screen area being a partial screen area of the touchscreen and being different from the first screen area, from among the plurality of algorithms;
   identify a second input for the second screen area; and
   obtain position information for the second input using the second algorithm.

3. The electronic device of claim 2, wherein the first screen area corresponds to a first user interface of a first application, and
   wherein the second screen area corresponds to a second user interface of the first application or a second application.

4. The electronic device of claim 2, wherein the first screen area corresponds to a portion of a first user interface of a first application, and
   wherein the second screen area corresponds to another portion of the first user interface.

5. The electronic device of claim 2, wherein the first algorithm is configured to obtain the position information based on detection values identified in a square matrix having a designated size or detection values identified as greater than or equal to a changed second reference value, and
   wherein the second algorithm is configured to obtain the position information based on detection values identified as greater than or equal to a first reference value on the touchscreen according to the input.

6. The electronic device of claim 1,
   wherein the second screen area corresponds to a user interface of a second application different from a user interface of a first application corresponding to the first screen area.

7. A method for operating an electronic device, the method comprising:
   storing information for a plurality of algorithms for identifying a position of an input in the memory;
   identifying a first screen area of the touchscreen, the first screen area being a partial screen area of the touchscreen, based on a grip position identified using at least one sensor or based on a folded portion of the display; and
   identifying a remaining area other than the first screen area as a second screen area of the touchscreen,
   identifying a first algorithm corresponding to the first screen area from among the plurality of algorithms;
   identifying a first input for the first screen area; and
   obtaining touch coordinate information on the touchscreen corresponding to a position according to the first input using the first algorithm.

8. The method of claim 7, further comprising:
   identifying a second algorithm corresponding to the second screen area, the second screen area being a partial screen area of the touchscreen and is different from the first screen area, from among the plurality of algorithms;
   identifying a second input for the second screen area; and
   obtaining position information for the second input using the second algorithm.

9. The method of claim 8, wherein the first screen area corresponds to a first user interface of a first application, and
   wherein the second screen area corresponds to a second user interface of the first application or a second application.

10. The method of claim 8, wherein the first screen area corresponds to a portion of a first user interface of a first application, and
    wherein the second screen area corresponds to another portion of the first user interface.

11. The method of claim 8, wherein the first algorithm is configured to obtain the position information based on detection values identified in a square matrix having a designated size or detection values identified as greater than or equal to a changed second reference value, and
    wherein the second algorithm is configured to obtain the position information based on detection values identified as greater than or equal to a first reference value on the touchscreen according to the input.

12. The method of claim 7, further comprising:
    wherein the second screen area corresponds to a user interface of a second application different from a user interface of a first application corresponding to the first screen area.

13. A non-transitory computer-readable storage medium having stored thereon a program including instructions that, when executed by at least one processor, cause an electronic device to perform operations comprising:
    storing information for a plurality of algorithms for identifying a position of an input in the memory;
    identifying a first screen area of the touchscreen, the first screen area being a partial screen area of the touchscreen, based on a grip position identified using at least one sensor or based on a folded portion of the display; and
    identifying a remaining area other than the first screen area as a second screen area of the touchscreen,
    identifying a first algorithm corresponding to the first screen area from among the plurality of algorithms;
    identifying a first input for the first screen area; and
    obtaining touch coordinate information on the touchscreen corresponding to a position according to the first input using the first algorithm.

* * * * *